3,338,965
PRODUCTION OF CYCLOHEXANONE OXIME
Reed H. Belden and David W. H. Roth, Jr., Chester, Va., assignors to Allied Chemical Corporation, New York, N.Y., a corporation of New York
Filed Mar. 3, 1965, Ser. No. 436,908
5 Claims. (Cl. 260—566)

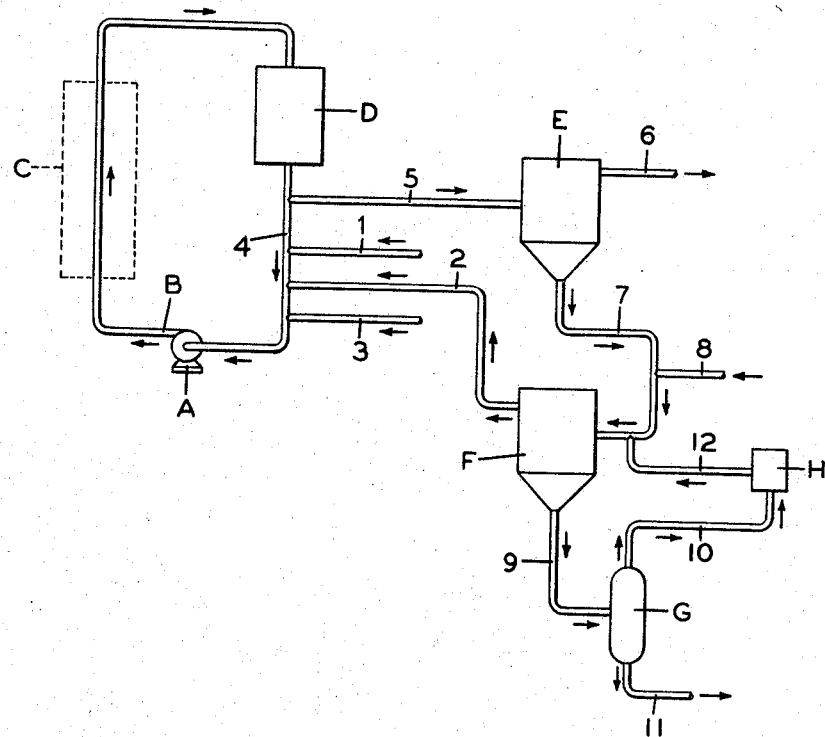

The present invention relates to the production of cyclohexanone oxime. It is especially concerned with an improved process for manufacturing cyclohexanone oxime having a low concentration of cyclohexanone.

Cyclohexanone oxime is employed commercially in large amounts for manufacturing epsilon caprolactan via the well known Beckmann rearrangement. It is known (U.S. Patent 2,270,204, Belgian Patent 555,380) to prepare cyclohexanone oxime by reacting cyclohexanone and a hydroxylamine salt e.g. hydroxylamine sulfate, in aqueous medium, while simultaneously neutralizing the acid liberated in the oximation reaction e.g. with ammonia. According to Belgian Patent 555,380 the reaction mixture and oxime product are maintained at a temperature above about 70° to obtain a molten oxime product which is free of organic and inorganic impurities which are present when the oxime is produced as a solid. The foregoing prior art processes have, however, prescribed neutralizing the oximation reaction to maintain an acid reaction mixture pH, i.e. of about 4 to 6, since as disclosed in aforementioned U.S. Patent 2,270,204 the rate of oximation is slow at a pH of about 7. Slow oximation of the ketone is particularly disadvantageous in manufacturing cyclohexanone oxime on a continuous basis, entailing impractically long residence times, e.g. of about one hour, or longer of the reaction mass in the oximation vessel. On the other hand oximation of cyclohexanone under acid conditions according to the aforementioned prior art procedures yields cyclohexanone oxime contaminated with cyclohexanone. Thus, even if an excess of hydroxylamine salt is employed in the oximation it is found that the product oxime contains a small quantity, generally about 0.5–0.8 weight percent of dissolved cyclohexanone (see U.S. Patent 3,002,996), the removal of which is difficult and expensive. The cyclohexanone contamination of the oxime not only results in substantial loss of the valuable ketone in large scale manufacture of the oxime, but also is detrimental to the quality of the lactam produced via Beckmann rearrangement of the oxime, particularly when the rearrangement is effected with oleum or fuming sulfuric acid as catalyst.

It is the principal object of the present invention to devise an improved process for manufacturing cyclohexanone oxime.

It is another object of this invention to devise an efficient process for manufacturing cyclohexanone oxime having a low concentration of cyclohexanone.

It is still a further object of the invention to devise a novel method of producing cyclohexanone oxime, which is eminently suitable for commercial operation in a continuous fashion.

These and other objects and advantages will be apparent from the following description of the invention.

We have made the surprising and valuable discovery that cyclohexanone can be rapidly reacted with hydroxylamine salt in neutral or basic aqueous medium to produce a cyclohexanone oxime product containing relatively low concentration of cyclohexanone by a process comprising the steps of:

(1) Reacting cyclohexanone with at least about a stoichiometric amount of a water-soluble hydroxylamine salt in aqueous medium at a temperature of at least about 70° C. sufficient to maintain the cyclohexanone oxime formed in molten condition, while maintaining the reaction mixture at a pH between about 6 and 11 by addition of an alkaline neutralizing agent and agitating the reaction mixture to a degree of turbulence corresponding to a pipe flow Reynolds number of at least about 5000 by employing agitation means operating at an input of at least about 0.05 horsepower per cubic foot of reaction mixture.

(2) Allowing at least a portion of the reaction mixture to stratify into a molten oxime layer and an aqueous layer and separating the layers to recover molten cyclohexanone oxime.

Unexpectedly we have found that oximation according to the present process is as rapid as oximation effected in acid medium according to the aforementioned procedures of the prior art.

Preferably the reaction mixture is agitated to impart a degree of turbulence corresponding to a pipe flow Reynolds number of about 7000 employing agitation means operating at a net horsepower input of about 0.07 per cubic foot of reaction mass. Agitating the reaction mixture to provide a greater degree of turbulence i.e. correspinding to a pipe flow Reynolds number of about 100,000 or greater employing agitation means operating at a net horsepower input of about 10 or greater per cubic foot of reaction mass, while effective, produces no additional advantage.

According to a preferred embodiment of the invention, wherein our novel oximation process is effected in a continuous manner, the separated aqueous layer (of step 2 above) containing dissolved cyclohexanone oxime, dissolved salts, such as ammonium sulfate produced in neutralization of the reaction as well as hydroxylamine value if an excess of the hydroxylamine reagent is charged to the oximation, is extracted with cyclohexanone. The resulting cyclohexanone extract, desirably containing about 12–15% by weight dissolved cyclohexanone oxime, is recycled to the oximation reaction mixture. Suitable procedures for extracting the aqueous layer with cyclohexanone and recycling the cyclohexanone extract to the oximation reaction mixture are described in copending coassigned U.S. Patent application, Ser. No. 767,447, now abandoned U.S. Patent 3,070,627, Belgian Patent 555,380 and British Patent 908,859.

In preparing cyclohexanone oxime according to the present invention any water soluble salt of hydroxylamine can be employed as the oximating reagent, for example hydroxylamine sulfate, hydroxylamine and sulfate hydroxylamine chloride and hydroxylamine nitrate. Aqueous hydroxylamine sulfate and aqueous hydroxylamine acid sulfate are preferred hydroxylamine reagents.

An especially good result is obtained by employing aqueous solutions of hydroxylamine sulfate and/or hydroxylamine acid sulfate which also contain dissolved ammonium sulfate and/or ammonium bisulfate. The latter solutions are conveniently obtained by hydrolysis of ammonium hydroxylamine disulfonate as disclosed in aforementioned U.S. Patent 3,070,627. Conveniently about a 10–40% by weight aqueous solution of the hydroxylamine salt is charged to the oximation.

Any water soluble base which has a basic dissociation constant greater than about $1 \times 10^{-6}$ and which forms water soluble salts with strong acids can be employed in neutralizing acid liberated by the reaction of the cyclohexanone and the hydroxylamine salt. Preferably ammonia either in gaseous form or in aqueous solution is used. An especially good result is obtained in neutralizing the oximation reaction mass with gaseous ammonia.

Either pure cyclohexanone or cyclohexanone containing dissolved cyclohexanone oxime is charged as starting material to the present novel oximation process. According to a preferred continuous mode of carrying out the present process cyclohexanone containing about 12 to 15 weight percent of the oxime is charged to the oximation reaction vessel.

The amount of cyclohexanone charged to the oximation reaction mixture should be at least about 0.001 part per part by weight of water present in the reaction mixture to insure that a cyclohexanone oxime phase separates from the aqueous portion of the reaction mass.

In effecting the reaction of the hydroxylamine salt and cyclohexanone according to the invention at least about a stoichiometric quantity of hydroxylamine salt is charged to the reaction. Preferably we employ about a 5 to 15 percent molar excess of the hydroxylamine salt.

The acid which is liberated by the reaction of the hydroxylamine salt and cyclohexanone is neutralized by addition of base at a rate to maintain a pH of about 6 to 11, preferably about 6.5 to 7.3 and especially about 7.

The temperature of the oximation mixture is maintained above about 70° C. to insure that cyclohexanone oxime is formed and separated in the molten state. The temperature of the reaction mixture is maintained below the boiling point of the water of the reaction mixture, i.e. about 105–110° C. to avoid use of pressurized reaction equipment and to prevent thermal degradation of the oxime product. Preferably oxime formation according to the invention is carried out at about 80–95° C. and especially at about 85° C.

The figure is a flow sheet illustrative of one form of the preferred continuous mode of operation of our novel process.

With reference to the figure ammonia, cyclohexanone containing 12 to 15 weight percent dissolved cyclohexanone oxime, and an aqueous solution of hydroxylamine acid sulfate and ammonium sulfate are charged via lines 1, 2 and 3 respectively to line 4 of the oximation reactor loop ABD. The mixture passes through mixing device A which operates at about 0.07 net horsepower input per cubic foot of reaction mass and circulates the reacting mass in a condition of turbulence corresponding to a Reynolds number of about 7000 through reaction pipe B. The exothermic character of the oximation provides sufficient heat to maintain the temperature of the mixture above about 70° and the reaction temperature is maintained at 80–95° C. via external cooling provided by heat exchanger C surrounding B. The mixture flows through settling tank D which diminishes the turbulence of the circulating reaction mass. Liquid reaction mass is withdrawn from the reactor loop and flowed to decantation tank E via line 5. The liquid mixture is allowed to stratify in E at 80–95° C. and the upper molten oxime layer which separates is drawn off via line 6. The lower aqueous layer containing dissolved oxime is withdrawn via line 7 and, by a procedure similar to that of above cited U.S. Patent application Ser. No. 767,447 and now abandoned is extracted continuously with pure cyclohexanone which is introduced via line 8, and aqueous cyclohexanone which is obtained in a later stage of the process and introduced via line 12. The cyclohexanone extraction mixture is flowed to decantation tank F from which a cyclohexanone extract layer containing dissolved oxime is decanted and recycled to the oximation reactor via line 2. The aqueous ammonium sulfate raffinate in F is withdrawn via line 9 and conveyed to still G. The aqueous raffinate which contains dissolved cyclohexanone is distilled in G according to a procedure analogous to that above mentioned U.S. Patent 3,070,627. The cyclohexanone-water vapors from G pass via line 10 to condenser H and the condensate therefrom is recycled to the cyclohexanone extraction mixture via line 12. The aqueous distilland containing dissolved ammonium sulfate is continuously withdrawn from G via line 11.

Agitation of the reaction mixture in the above schematic representation is provided by mechanical mixing device A, which circulates the reaction mass through the reactor loop, and which may be for example a centrifugal pump, a turbomixer or other high speed agitator.

The present invention has been defined with reference to agitation of the oximation mass in a tubular reaction vessel, e.g. pipe B in the above described reactor loop ABD. However, the present novel oximation process can be effected in reaction tanks varying widely in shape which are agitated by impellors, propellors, other high speed stirring devices provided that stirring device used imparts a degree of turbulence to the reaction mass equivalent to that defined above. Suitable operating conditions to achieve the latter degree of turbulence in non-tubular reaction vessels are readily determined by known methods of the art for example the methods disclosed by J. H. Rushton et al., Chem. Eng. Progr., 46, 395, 467 (1950).

The present invention provides an efficient method of preparing molten cyclohexanone oxime which is eminently suitable for operation in a continuous manner. In as much as oximation according to the invention takes place rapidly, very short residence times, e.g. of the order of about 10 minutes or less can be employed in the manufacture of cyclohexanone oxime on a continuous basis.

Also, the novel process of the invention affords molten cyclohexanone oxime containing at least about 20% and generally 50 to 60% less cyclohexanone than oxime obtained via the corresponding oximation in acid medium. The molten oxime product of the present invention which contains about 4 to 6% by weight water can be converted without further purification to excellent epsilon caprolactam via the Beckmann rearrangement, for example by rearrangement catalyzed by oleum or fuming sulfuric acid according to the process of British Patent 923,302.

In the following examples which serve to illustrate our invention temperatures are in degrees centigrade and unless otherwise noted parts and percentages are by weight per hour.

Example 1

Ammonia gas (2475 parts), at a pressure of 30 p.s.i.g., 8645 parts of a cyclohexanone extract, which contains 7146 parts (72.8 moles) of cyclohexanone, 976 parts cyclohexanone oxime and 523 parts of water and is recycled from a later stage of the process, and 60,600 parts of an aqueous solution containing 10,600 parts of hydroxylamine acid sulfate (80.7 moles) and 12,100 parts of ammonium sulfate, are charged continuously to an oximation reaction loop as shown in FIG. 1 maintained at about 85°. The resulting mixture, which has a pH of about 7, is agitated and circulated by a centrifugal pump operating at a net horsepower of 0.07 per cubic foot of reaction mass through a reaction pipe having a length of 24 feet and internal diameter of 10 inches under a condition of turbulence at a Reynolds number of 7000. The heterogeneous reaction mass is maintained at about 85° by external cooling of the reaction pipe. After a residence time of about ten minutes in the reactor, liquid reaction mixture is continuously withdrawn and allowed to stratify at 85° into two layers, a cyclohexanone oxime phase (viscosity about 7 centipoises at 85° C., and density about 1.05 parts by weight per part by volume) and an aqueous ammonium sulfate layer (viscosity about 1 centipoise, density about 1.25 parts by weight per part by volume). The molten cyclohexanone oxime product (9750 parts, containing 9,192 parts of oxime, 529 parts water and 29 parts (0.298%) cyclohexanone) which separates as the upper layer is recovered by decantation. The lower aqueous layer (61,970 parts, containing 267 parts hydroxylamine, 22,770 parts ammonium sulfate, 61 parts cyclohexanone oxime and 38,872 parts water) is flowed to an agitated extraction zone, mixed with cyclohexanone (7146 parts) and cooled to 50°, and then mixed with aqueous cyclohexanone (1350 parts, containing 200 parts cyclohexanone) which is obtained in a later stage of the process. The mixture flows to a separator and is allowed to stratify into two layers. The upper cyclohexanone extract layer (8645 parts) is decanted and recycled to the oximation reaction. The lower aqueous raffinate layer (62,620 parts containing 200 parts dissolved cyclohexanone, 22,770 parts ammonium sulfate and 39,650 parts of water) is withdrawn and distilled according to a procedure similar to that described in U.S. Patent 3,070,-627 to obtain an aqueous cyclohexanone distillate which is recycled to the extraction mixture. The aqueous distilland is recovered and treated to recover dissolved ammonium sulfate.

*Example 2 (Comparison)*

The process of Example 1 is repeated substantially as described except that the reaction mixture is maintained at a pH of 3.5 by addition of a smaller amount (2228 parts) of ammonia.

The molten oxime layer (9,744 parts) which is recovered contains 9148 parts of cyclohexanone oxime, 529 parts of water and 67 parts (0.69%) of cyclohexanone.

We claim:

1. A process for producing cyclohexanone oxime which comprises reacting cyclohexanone with at least a stoichiometric quantity of water soluble hydroxylamine salt in aqueous medium at a temperature of at least about 70° C. sufficient to maintain the cyclohexanone oxime in molten condition, while maintaining the reaction mixture at a pH between about 6 and 11 by addition of an alkaline neutralizing agent and under a condition of turbulence corresponding to a pipe flow Reynolds number of at least about 5000 by employing agitation means operating at a net horsepower input of at least about 0.05 per cubic foot of reaction mixture, allowing at least a portion of the reaction product to separate into a layer of molten cyclohexanone oxime and an aqueous layer and isolating the molten cyclohexanone oxime layer.

2. The process of claim 1 wherein the molten cyclohexanone oxime product produced contains less than 0.5% cyclohexanone.

3. The process of claim 1 comprising continuously introducing the reactants into the reaction mixture being circulated in a pipe reactor, continuously removing a portion of the reaction mass and allowing it to separate into a molten cyclohexanone oxime phase and an aqueous phase.

4. The process of claim 3 wherein the reaction mixture is agitated by a rotary mixer operating at least at about 1000 r.p.m.

5. The process of claim 3 wherein the hydroxylamine salt is a sulfate and is used in 5 to 15% molar excess, the neutralizing agent is ammonia and the reaction mixture is maintained between about 70° and 110°.

No references cited.

CHARLES B. PARKER, *Primary Examiner.*

R. HINES, *Assistant Examiner.*